Patented Aug. 30, 1932

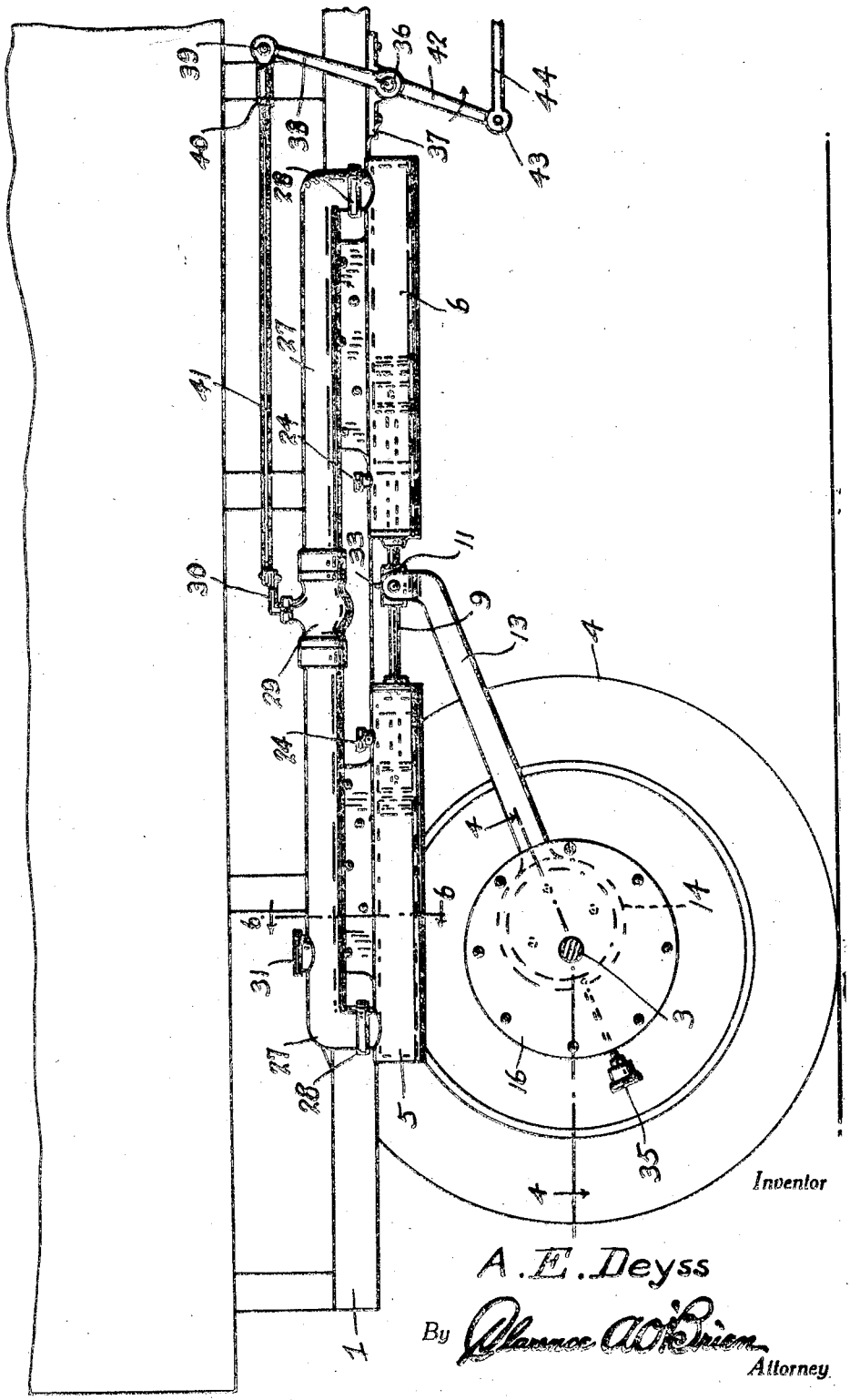

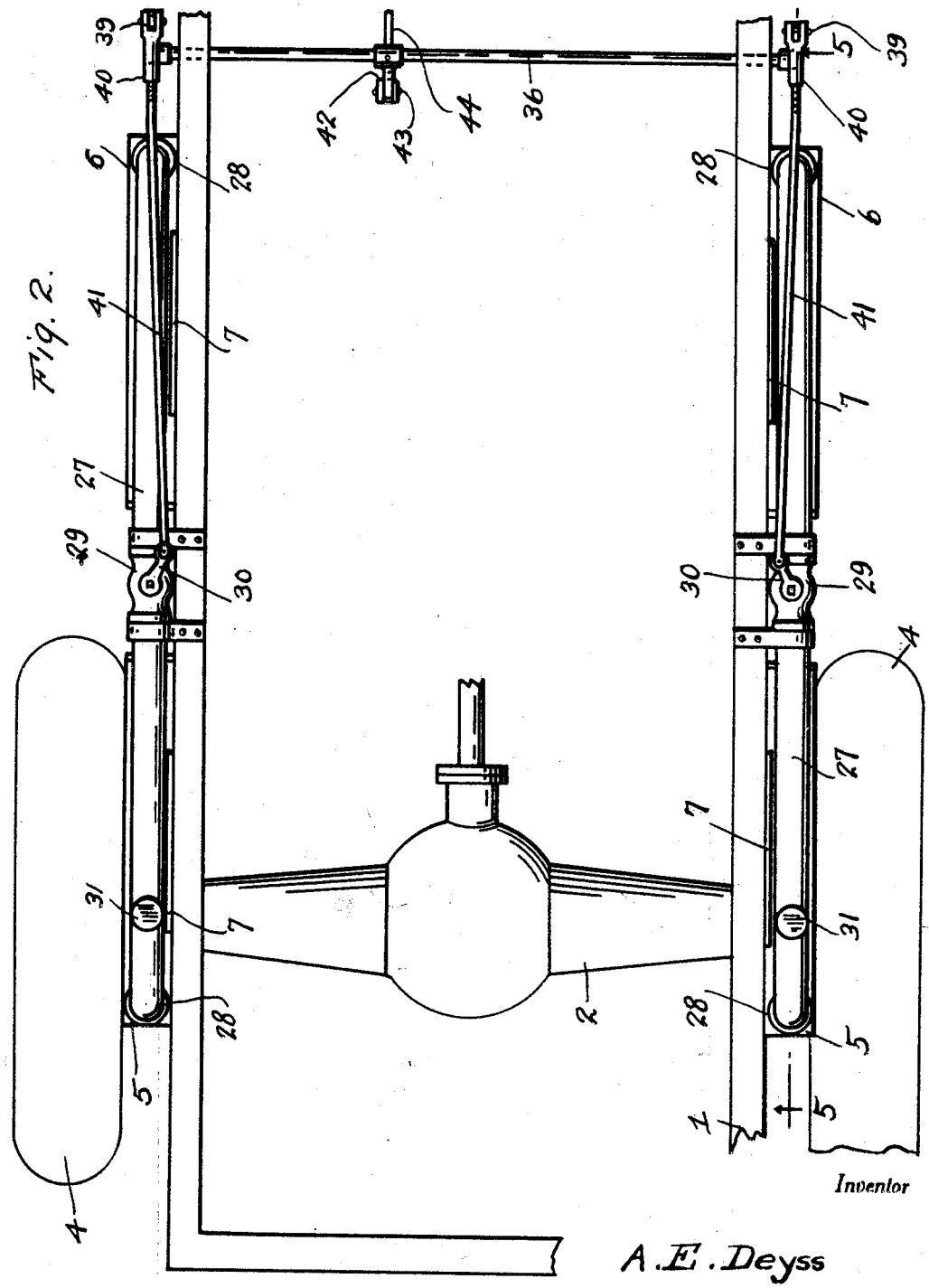

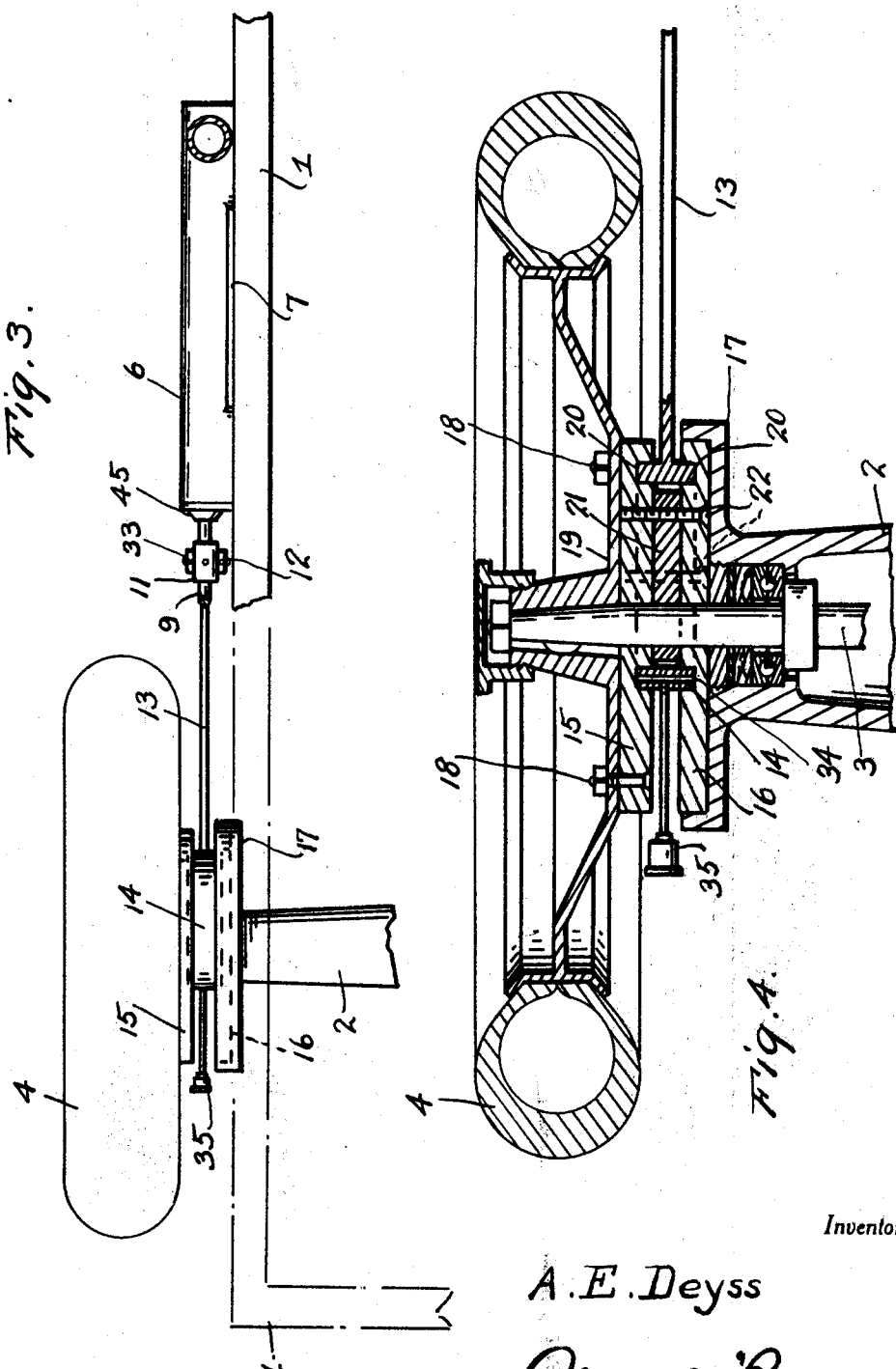

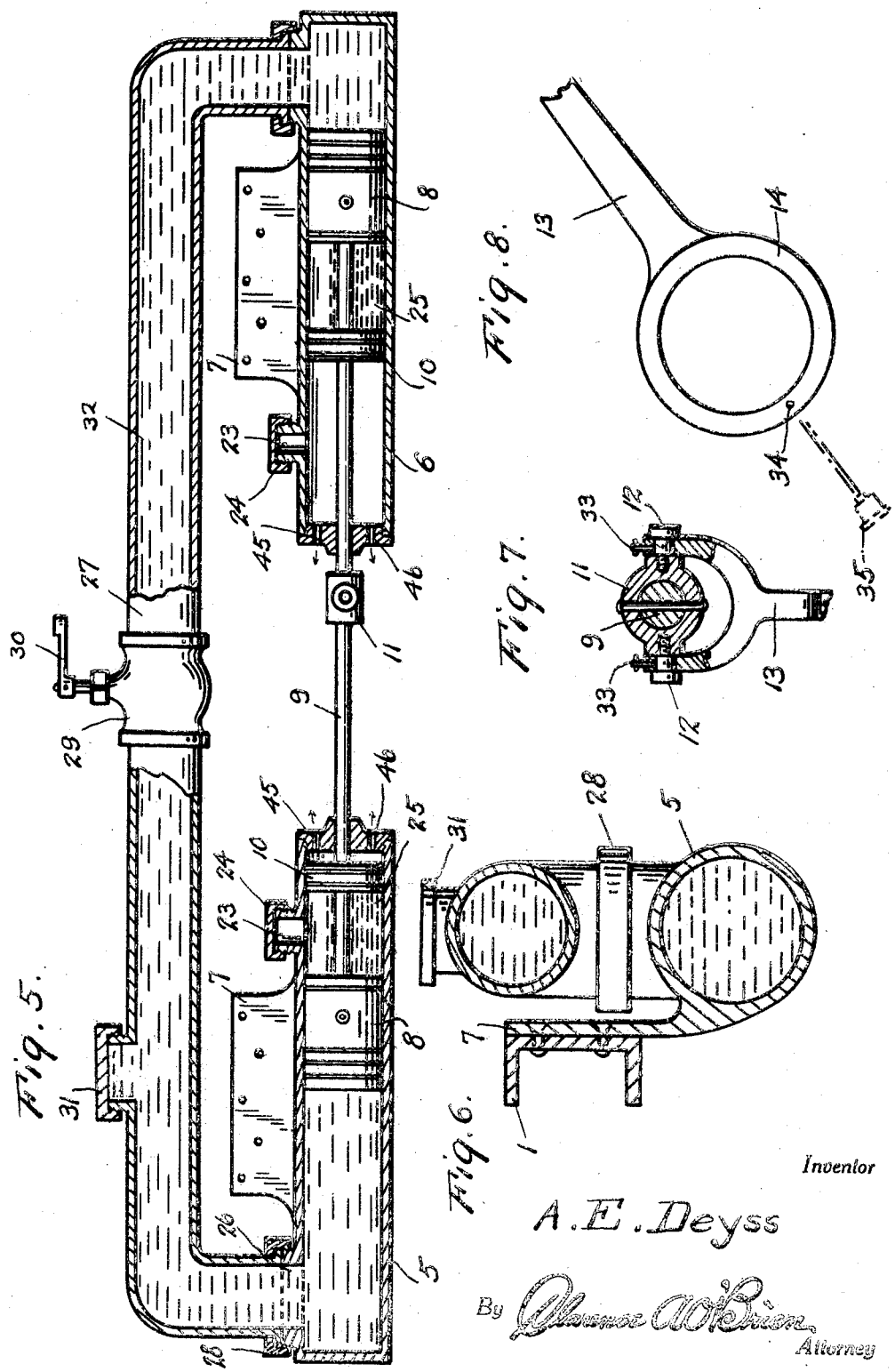

1,874,252

UNITED STATES PATENT OFFICE

ALFRED E. DEYSS, OF EAST SCHODACK, NEW YORK

VEHICLE BRAKE

Application filed August 25, 1930. Serial No. 477,697.

This invention relates broadly to brakes for vehicles and has more particular reference to a brake for self propelled vehicles such as automobiles and the like.

The primary object of this invention is to provide a brake which may be readily associated with the wheel of the vehicle, requiring but a minimum alteration in the construction of the vehicle for adapting the vehicle to a brake of this character.

A still further object of the invention is to provide a hydraulic brake for self propelled vehicles, it being an important object of the invention to permit of the vehicle having each of the wheels equipped with a brake of the character of the present invention or merely the rear wheels so equipped as suits the operator of the vehicle.

Briefly stated, the invention comprehends the connecting of a wheel of the vehicle with a circulation system so that the wheel drives a pair of pistons causing a medium to circulate in the system, and further to provide suitable means within the system for stopping the circulation, or if desired, to merely check the circulation, whereby the rotation of the wheel is checked or retarded for decreasing the speed of the vehicle or bringing the latter to a complete stop.

Other objects and advantages of the invention will become apparent during a study of the following description, taken in connection with the accompanying drawings wherein:

Figure 1 is a side elevational view of the brake the same being shown as applied to the vehicle in operative relation with one rear wheel of the vehicle, the remaining one of the rear wheels being removed.

Figure 2 is a fragmentary top plan view as outlined, of the chassis of a motor vehicle having my device associated therewith, Figure 3 is a top plan view of the brake device, the same being shown as applied to one rear wheel of the vehicle, Figure 4 is a detail sectional view taken substantially on the line 4—4 of Figure 1, Figure 5 is a longitudinal sectional view, certain parts being shown in elevation and taken substantially on the line 5—5 of Figure 2, Figure 6 is a vertical transverse sectional view taken substantially on the line 6—6 of Figure 1, Figure 7 is a fragmentary detail view partly in section and partly in elevation illustrating certain details of construction to be hereinafter fully referred to, Figure 8 is a fragmentary plan view of the push rod forming part of the invention.

Referring to the drawings, it will be seen that in Figure 2 I have shown the rear portion of a vehicle chassis including the side chassis bars 1, the rear axle housing of the vehicle being designated by the reference character 2, the rear axle being clearly shown in Figure 4 being designated by the reference character 3, and the two rear wheels by the reference character 4.

For each of the rear wheels 4 I provide a brake mechanism, the same comprising a pair of horizontally disposed alined cylinders 5 and 6, each of which is equipped with a suitably apertured attaching flange 7 whereby the cylinder may be supported from the side chassis bar 1.

Each of the cylinders has workable therein a piston 8, which pistons are provided with a common piston rod 9. Carried by the rod 9, and arranged in each of the cylinders, in longitudinal spaced relation to the piston 8 is a sub-piston 10. Exteriorly of the cylinders, there is suitably keyed to the rod 9 a sleeve 11 to which is pivotally connected as at 12 the forked end of a push rod 13. The push rod 13 at its free end is equipped with an integral annulus 14.

The ring 14, as shown in Figure 4 is arranged between a pair of similar disks 15 and 16 respectively for rotation with the disks. One of the disks 16 is rotatably mounted within the enlarged annular head 17 formed on the end of the axle housing 2. The other of the disks namely the disk 15 is bolted or otherwise secured as at 18 to the hub portion 19 of the vehicle wheel 4. Each of the disks 15 and 16 is provided, of course, with a central opening for accommodating the end portion of the axle 3. Furthermore, each of the disks on its inner face is provided with an eccentric groove 20 for accommodating one end portion of the ring 14. The disks 15 and 16 have interposed therebetween a suitable shim 21, and the disks, and shim are maintained in assembled relation through the medium of suitable bolts 22. The shim 21 is arranged eccentrically with respect to the disks, and is provided with an eccentric opening for accommodating the end portion of the axle 3 as is apparent.

From the foregoing then it will be seen that as the wheel 4 rotates, oscillatory movement is imparted to the push rod 13 which in turn transmits reciprocatory movement to the piston rod 9 for reciprocating the pistons 8 in their respective cylinders. Of course, the pistons 10 will also be reciprocated during reciprocation of the piston 8.

Each of the cylinders adjacent one end is provided with a filling neck 23 normally closed through the medium of a cap 24. Into the filling neck 23 for disposition within the cylinder between the pistons 8 and 10, may be applied a suitable lubricant as for example oil 25.

Each of the cylinders adjacent its other end, is provided with a port 26 adapted to register with one end of a substantially U-shaped fluid conduit pipe designated generally by the reference character 27. The pipe 27 at the end thereof is suitably coupled to the cylinders for registry with the port 26 through any suitable coupling means such as suggested at 28.

Arranged intermediate the fluid conduit pipe 27 is a suitable control valve 29 that includes among other parts, a crank arm 30.

The crank arm 30 may be operated by the operator of the vehicle for controlling the opening and closing of the valve 29 by any suitable means and dependent upon whether one or more wheels of the vehicle is equipped with a brake of the character described.

Adjacent one end thereof, the pipe 27 is provided with a normally closed filling opening 31 whereby a suitable fluid 32 such as glycerine may be placed within the pipe in the port from one cylinder to the other.

From the foregoing, it will be apparent that when the valve 29 is opened, the pistons 8 are free to reciprocate within respective cylinders offering little or no resistance to the vehicle wheel 4. When it be desired to bring the vehicle to a stop, the operator of the vehicle through the medium of a suitable mechanism will actuate the crank arm 30 of valve 29 thus closing the valve whereby an obstruction is offered to the fluid 32 passing through the pipe 27 from one cylinder to the other. Manifestly, when the valve 29 is so closed, a back pressure will be formed in the cylinder and this back pressure of the fluid 32 on the piston will act opposingly with respect to the wheel 4 on the piston, consequently preventing the rotation of the wheel 4, resulting, of course, in the bringing of the vehicle to a stop. Immediately upon opening of the valve 29, the pistons 8 will be permitted to operate freely in their cylinders so that as the pistons move in one direction, one piston will suck in or draw the fluid through the pipe 27 into the cylinder of that particular piston for example as suggested in Figure 5 in cylinder 5; on the other hand the piston 8 operating in the other cylinder for example cylinder 6 will force the fluid 32 from cylinder 6 through the pipe 27.

Obviously, therefore, as the valve 29 is slowly actuated to be moved from an open to a closed position, pressure on the piston 8 will be gradual so that consequently the vehicle may be brought to a gradual stop, thus permitting the vehicle to be brought to a smooth stop free of the jerking, the usual weakness, grabbing and other like undesirable results usually incident to applying the brake to a vehicle.

Manifestly, the lubricant 25 within the cylinders between the pistons 8 and 10 will afford proper lubrication for the moving parts, and in addition to this lubrication, the pivotal connection between the sleeve 11 and push rod 13 may be also maintained in a well lubricated condition through the medium of grease cups 33. Furthermore, the ring 14 is provided with a transverse grease passage 34 whereby lubricant from a suitable grease cup 35 extending radially from the ring may be supplied to the grooves 20 of the disks 15 and 16 thus maintaining these parts at all times in a well lubricated condition.

In Figure 2 I have shown each of the rear wheels 4 equipped with a brake mechanism of the character described in detail. To simultaneously operate the valves 29 of the brake mechanism, I provide a rock shaft 36 that extends transversely of the chassis frame of the vehicle, the rock shaft 36 being suitably journalled in bearings 37 provided therefor on the chassis bar 1. At each end thereof the rock shaft 36 is provided with a crank arm 38 that has pivoted to its upper end as at 39 an internally threaded sleeve 40. The crank arm 30 of each of the valves 39 has pivoted to the free end thereof an operating rod 41, the same at its free end being threaded for threaded reception in one of the sleeves 40 thus providing as it were an adjustable connection between the crank shaft arm 30 of the valve, and the crank arm 38 of the rock shaft 36.

Intermediate its ends, the rock shaft 36 is also provided with a crank arm 42 that at its lower end is pivotally connected as at 43 with the control rod 40 adapted to have suitable operative connection with the brake pedal (not shown) of the vehicle. Obviously therefore when applying the brake, the brake pedal (not shown) may be pressed in the usual manner thus locking the shaft 36 whereby rotative movement is transmitted to the valve crank arm 30 through the medium of the operating rods 41 so that obviously the valves 29 are simultaneously operated for closing the valve incident to applying braking action on the wheels 4.

In Figure 5 it will be noted that the confronting ends of the cylinders are normally closed through the medium of caps 45 which are suitably apertured for accommodating the rod 9. The caps 45 respectively are also provided with air vent openings 46.

The operation of the device is thought apparent, and that while the vehicle is in motion, the pistons 8 will be permitted to reciprocate freely within the cylinders, the motion being transmitted to the pistons through the medium of the eccentric connection of the push rod with the wheel of the vehicle. When it is desired to lessen the speed of the vehicle, or to bring the latter to a complete stop, the operator by pressing on the brake pedal (not shown) will rock shaft 36 thus, through the mechanism before described, close the valve 29 for checking or retarding the flow of fluid 32 through the fluid conduit with the result that compression in the cylinders will be increased preventing further movement of the pistons in their cylinders thus locking the wheel 4 of the vehicle against rotation whereby the vehicle is brought to a stop.

Even though I have herein shown and described, the preferred embodiment of the invention, it is to be understood that the same is susceptible to changes fully comprehended by the spirit of the invention as herein described, and the scope of the appended claim.

Having thus described my invention, what I claim as new is:

In a device of the class described, a pair of spaced opposed rotary members having their confronting faces provided with eccentric grooves, a shim member located between said members and eccentrically arranged relative thereto, said shim member being of slightly less diameter than the internal diameters of the grooves, means for fastening the two members and the shim member together, a reciprocatory member having a ring-shaped part attached to one end thereof and fitting in said grooves, said ring-shaped part being of greater thickness than the reciprocatory member.

In testimony whereof I affix my signature.

ALFRED E. DEYSS.